No. 613,187. Patented Oct. 25, 1898.
W. E. BOYD.
SPEED INDICATOR FOR BICYCLES.
(Application filed June 27, 1896.)
(No Model.)
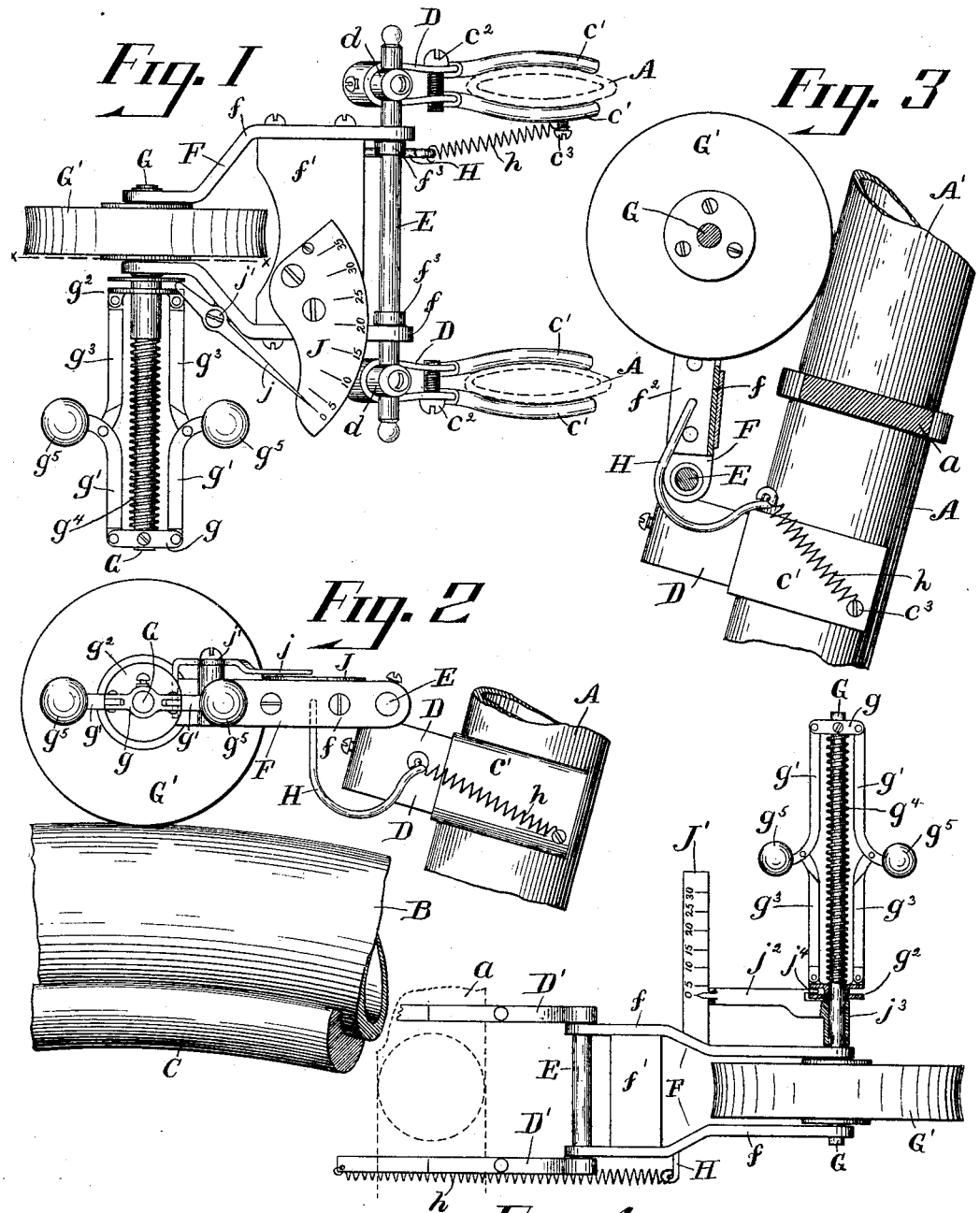
WITNESSES
Sherwood R. Taylor
Emma Lyford
INVENTOR
Walter E. Boyd
By Geo. J. Murray
Atty

UNITED STATES PATENT OFFICE.

WALTER E. BOYD, OF CINCINNATI, OHIO, ASSIGNOR OF ONE-THIRD TO MILTON C. MAHONE, OF BELLEVUE, KENTUCKY.

SPEED-INDICATOR FOR BICYCLES.

SPECIFICATION forming part of Letters Patent No. 613,187, dated October 25, 1898.

Application filed June 27, 1896. Serial No. 597,248. (No model.)

*To all whom it may concern:*

Be it known that I, WALTER E. BOYD, a citizen of the United States, and a resident of Cincinnati, in the county of Hamilton and State of Ohio, have invented certain new and useful Improvements in Speed-Indicators for Bicycles, of which the following is a specification.

The object of my invention is to provide a speed-indicator for bicycles, and is especially intended for use by those training for contests.

It consists in the peculiar device arranged to be actuated by the front wheel and to be attached to the front-wheel fork in such position that the rider may at all times observe the speed at which the machine is traveling.

The invention will be first fully described in connection with the accompanying drawings, and then particularly referred to and pointed out in the claim.

Referring to the drawings, in which like parts are indicated by similar reference-letters wherever they occur throughout the various views, Figure 1 is a plan view of the device ready to be applied to the wheel. Fig. 2 is a side view of the same and so much of the wheel-fork, tire, and rim of a bicycle as is necessary to illustrate the application of the device for use. Fig. 3 is a vertical sectional view of the same, taken through line $x\ x$ of Fig. 1, showing the indicator thrown up out of use. Fig. 4 is a plan view of a modified form of my invention.

Referring first to Figs. 1 to 3, inclusive, A represents a portion of one arm of the front-wheel fork, B the pneumatic tire, and C the customary wheel-rim. The device is secured to the forks of the front wheel by clamps D, which are formed of spring metal bent around and secured by a set-screw to stud-posts $d$, which are perforated to receive the shaft E, upon which the swinging frame F is journaled. The clamps terminate in spring-fingers shaped to embrace the forks of the wheel, the ends being armed with rubber tubes $c'$. These fingers are clamped upon the forks or released by screws $c^2$, which pass freely through one of the arms and are tapped through threaded openings in the opposite arm.

The frame F is composed of two side arms $f$, through which the shaft E passes, the arms $f$ being braced apart by a plate $f'$, which has its ends $f^2$ bent down at an angle to receive fastening-screws, which pass through the arms and are tapped into the angles $f'$ of the plate. The frame is steadied in its position upon the shaft by collars $f^3$. In the forward end of this frame is journaled a spindle G, upon which is secured a friction-wheel $G'$. The face of the wheel is concave to bear its full width upon the periphery of the tire B when the device is thrown to its working position, as seen in Fig. 2. In one of the angles $f^2$ is pivoted one end of a curved rod H, the opposite end being turned into an eye to receive one end of a coiled spring $h$, the opposite end of which is held by a screw $c^3$, tapped into one of the clamping-fingers $c'$. The purpose of this arrangement is to hold the wheel $G'$ with sufficient force upon the tire when the device is thrown to the working position and to hold it against the handle-tube $A'$ of the front-wheel fork when it is thrown up out of working position, as shown in Fig. 3.

Upon the end of the spindle G which extends beyond the frame is secured a cross-head $g$, in which are pivoted the governor-arms $g'$, and upon the spindle, near the frame, is fitted a sliding sleeve $g^2$, which is connected by links $g^3$ to the arms $g'$. The coiled spring $g^4$, which is braced between the sleeve $g^2$ and the cross-head $g$, holds the sleeve in its normal position with sufficient force.

The index-plate J, appropriately numbered, is secured upon the plate $f'$, and an index finger or indicator $j$ is pivoted at $j'$ upon a lug projecting from one of the frame-arms. The short arm of this finger is armed with a pin which enters the groove in the sleeve $g^2$. Now it will be seen that when the balls $g^5$ of the governor are thrown outward by centrifugal force the sleeve will be drawn toward the cross-head, actuating the index-finger and indicating the speed at which the bicycle is traveling.

In the modification shown in Fig. 4 the governor is substantially the same; but the index-plate J' is straight, and the indicator $j^2$ extends from a sleeve $j^3$, fitted to slide on the spindle G, and has a finger $j^4$, which enters the groove in the sleeve $g^2$. The tongue on the end of the indicator $j^2$, which is struck from the center of the plate, passes over the face of the index-plate J', while the two fingers upon each side of the tongue pass underneath the plate to steady its movement. In this case the clamping-arms D' have their fingers grasp the top and bottom of the web or yoke $a$ of the front-wheel fork.

The cross-head $g$ is fastened onto the spindle with a set-screw, so as to make it adjustable along the spindle for the purpose of regulating the tension of the spring, which acts in opposition to the weighted arms, so that the speed may be accurately adjusted.

What I claim as new, and desire to secure by Letters Patent, is—

In a speed-indicator for bicycles the combination of the pivoted frame adapted to be secured to the front forks, the spindle journaled in said frame, a wheel and cross-head secured upon said spindle, a sleeve sliding thereon, weighted arms pivoted in the cross-head, links connecting said arms and the sliding sleeve, a spring coiled around the spindle and acting in opposition to the centrifugal action of the weights, an indicator actuated by the sleeve and a spring to hold the pivoted frame in or out of contact with the tire, substantially as shown and described.

WALTER E. BOYD.

Witnesses:
SHERWOOD R. TAYLOR,
GEO. J. MURRAY.